US011809733B2

(12) United States Patent
Bezugly et al.

(10) Patent No.: US 11,809,733 B2
(45) Date of Patent: *Nov. 7, 2023

(54) SYSTEMS AND METHODS FOR OBJECT MIGRATION IN STORAGE DEVICES

(71) Applicant: Dell Products L.P., Round Rock, TX (US)

(72) Inventors: Kirill Aleksandrovich Bezugly, Saint-Petersburg (RU); Nickolay Alexandrovich Dalmatov, Saint-Petersburg (RU)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/078,585

(22) Filed: Dec. 9, 2022

(65) Prior Publication Data

US 2023/0105953 A1 Apr. 6, 2023

Related U.S. Application Data

(63) Continuation of application No. 17/339,538, filed on Jun. 4, 2021, now Pat. No. 11,556,266.

(30) Foreign Application Priority Data

Oct. 22, 2020 (RU) .............................. 2020134691

(51) Int. Cl.
*G06F 12/00* (2006.01)
*G06F 3/06* (2006.01)

(52) U.S. Cl.
CPC .......... *G06F 3/0649* (2013.01); *G06F 3/0611* (2013.01); *G06F 3/0689* (2013.01)

(58) Field of Classification Search
CPC ..... G06F 3/0649; G06F 3/0611; G06F 3/0689
See application file for complete search history.

(56) References Cited

U.S. PATENT DOCUMENTS

| 2014/0324920 | A1* | 10/2014 | Hamilton .............. G06F 3/0685 707/812 |
| 2017/0249333 | A1 | 8/2017 | Krishnan et al. |
| 2018/0357229 | A1 | 12/2018 | Balasubrahmanian et al. |
| 2021/0109912 | A1 | 4/2021 | Biswas et al. |
| 2021/0373807 | A1 | 12/2021 | Danilov et al. |

\* cited by examiner

*Primary Examiner* — David Yi
*Assistant Examiner* — Tahilba O Puche
(74) *Attorney, Agent, or Firm* — Chamberlain, Hrdlicka, White, Williams, & Aughtry

(57) ABSTRACT

A method for storing data in a system that includes a plurality of storage devices, the method that includes obtaining object usage data from the plurality of storage devices, determining, using the object usage data, object clusters, where at least one object cluster of the object clusters includes at least two objects that are associated based on access patterns, migrate a first object, of the two objects, from a first storage device of the plurality of storage devices to a second storage device of the plurality of storage devices.

11 Claims, 14 Drawing Sheets

| Objects | Tier | Occurrences | Type | Action |
|---|---|---|---|---|
| A,B | B | Wednesday | Parallel | Move objects A and B to different storage devices in tier B |
| C,D | A | Monday, Saturday | Sequential | Move objects C and D to the same storage device in tier A |
| F,G,H | B | Friday | Sequential | Move objects F, G, and H to the same storage device in tier B |

FIG. 12

SYSTEMS AND METHODS FOR OBJECT MIGRATION IN STORAGE DEVICES

CROSS REFERENCE TO RELATED APPLICATIONS

This application is a continuation of U.S. patent application Ser. No. 17/339,538, filed Jun. 4, 2021. U.S. patent application Ser. No. 17/339,538, is hereby incorporated by reference in its entirety. Further, U.S. patent application Ser. No. 17/339,538 claims benefit to Russian Federation Patent Application No. 2020134691 filed on Oct. 22, 2020, which is also hereby incorporated by reference in its entirety.

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

SUMMARY

In general, in one aspect, embodiments relate to a method for storing data in a system that includes a plurality of storage devices, the method that includes obtaining object usage data from the plurality of storage devices, determining, using the object usage data, object clusters, where at least one object cluster of the object clusters includes at least two objects that are associated based on access patterns, migrate a first object, of the two objects, from a first storage device of the plurality of storage devices to a second storage device of the plurality of storage devices.

In general, in one aspect, embodiments relate to a non-transitory computer readable medium that includes instructions which, when executed by a computer processor, enables the computer processor to perform a method for storing data in a system that includes a plurality of storage devices, the method that includes obtaining object usage data from the plurality of storage devices, determining, using the object usage data, object clusters, where at least one object cluster of the object clusters includes at least two objects that are associated based on access patterns, migrate a first object, of the two objects, from a first storage device of the plurality of storage devices to a second storage device of the plurality of storage devices.

In general, in one aspect, embodiments relate to a node, that includes a plurality of storage devices, memory, and a processor, where the processor is configured to perform a method for storing data in the node, the method that includes obtaining object usage data from the plurality of storage devices, determining, using the object usage data, object clusters, where at least one object cluster of the object clusters includes at least two objects that are associated based on access patterns, migrate a first object, of the two objects, from a first storage device of the plurality of storage devices to a second storage device of the plurality of storage devices.

Other aspects of the invention will be apparent from the following description and the appended claims.

BRIEF DESCRIPTION OF DRAWINGS

FIG. 12 shows an example of actions taken by an object manager, in accordance with one or more embodiments of the invention.

DETAILED DESCRIPTION

Figure 1:
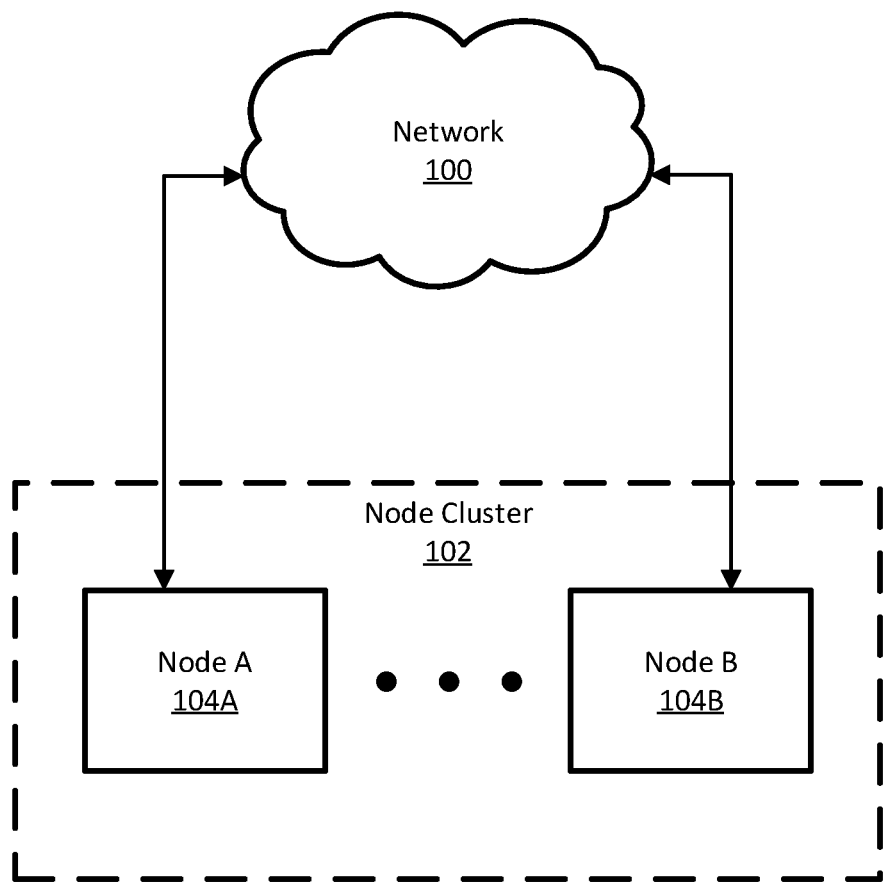
FIG. 1 shows a diagram of system, in accordance with one or more embodiments of the invention.

In general, embodiments of the invention relate to systems and methods for optimizing file objects based on usage patterns and relation to other objects. File objects although seemingly independent file structures, may be accessed (read) and/or manipulated (written to) in identifiable patterns with other objects. That is, while two objects may be written to two different storage devices, on two different servers, a program may access both of the objects in regular, identifiable patterns. Further, the program may require information from both objects before proceeding to the next instruction in the process. Accordingly, if latency to one of the objects is greater than the latency to access the other, performance of the program suffers as the location of the objects within storage devices is not optimized.

To improve efficiency in such scenarios, objects may be strategically relocated from one storage device to another storage device to optimize for faster access and processing. Continuing with the example above, the object that is accessed with lower latency may be relocated to the same server that includes the object accessed with faster latency. Accordingly, thereafter, each object should be accessed with similar latency. Further, if the objects are accessed concurrently (or nearly concurrently accessed), the objects may be moved to different storage devices within the same server to avoid causing delays in attempting concurrent retrieval of both objects from the single storage device (particularly in instances where sequential access is utilized).

Further, for the identification of associated objects, one or more methods may be employed to identify object clusters (based on object usage). Specifically, in one or more embodiments of the invention, certain artificial intelligence methods may be utilized to aide in the identification of object clusters. As an example, two objects may be utilized in a pattern that is too complicated for a human to identify;

however, certain classes of artificial intelligence (e.g., deep neural networks) may be able to identify related objects with those comparatively complicated usage patterns. Accordingly, by collecting usage data and utilizing advanced pattern identification processes, a greater number of object clusters may be identifiable. Then once identified, those objects may be optimized by relocating those objects to different servers, tiers of storage devices (e.g., magnetic tape to solid state), and different or same drives within those tiers (based on whether objects are accessed in parallel or sequentially).

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

FIG. 1 shows a diagram of system, in accordance with one or more embodiments of the invention. The system may include a network (e.g., network (100)) and a (e.g., node cluster (102)) which includes two or more nodes (e.g., node A (104A), node B (104B), etc.). Each of these components is described below.

In one or more embodiments of the invention, a network (e.g., network (100)) is a collection of connected network devices (not shown) that allow for the communication of data from one network device (not shown) to other network devices (not shown), or the sharing of resources among network devices (not shown). Examples of a network (e.g., network (100)) include, but are not limited to, a local area network (LAN), a wide area network (WAN) (e.g., the Internet), a mobile network, or any other type of network that allows for the communication of data and sharing of resources among network devices and/or devices operatively connected to the network (100) (e.g., node A (104A) and node B (104B)). One of ordinary skill in the art, having the benefit of this detailed description, would appreciate that a network (e.g., network (100)) is collection of operatively connected devices that enables communication between those devices.

In one or more embodiments of the invention, a node cluster (102) is a collection of two or more operatively connected node(s) (104A, 104B). Node(s) (104A, 104B) of a cluster (102) may be operatively connected via a network (e.g., network (100)). In one or more embodiments of the invention, a node (e.g., node A (104A), node B (104B)) is a computing device (not shown). In one or more embodiments of the invention, a computing device includes one or more processor(s), memory, and persistent storage. The persistent storage (and/or memory) may store computer instructions (e.g., computer code) which, when executed by the processor(s) of the computing device, cause the computing device to issue one or more requests and to receive one or more responses. Non-limiting examples of a computing device include a mobile phone, tablet computer, laptop computer, desktop computer, server, distributed computing system, or cloud resource. Additional details regarding node(s) (104A, 104B) may be found in the discussion of FIG. 2.

While FIG. 1 shows a specific configuration of a system, other configurations may be used without departing from the scope of the invention. For example, although only two nodes are shown in FIG. 1, the node cluster may include any positive integer number of nodes (e.g., 3, 4, 5, etc.). Accordingly, embodiments disclosed herein should not be limited to the configuration of devices and/or components shown in FIG. 1.

Figure 2:
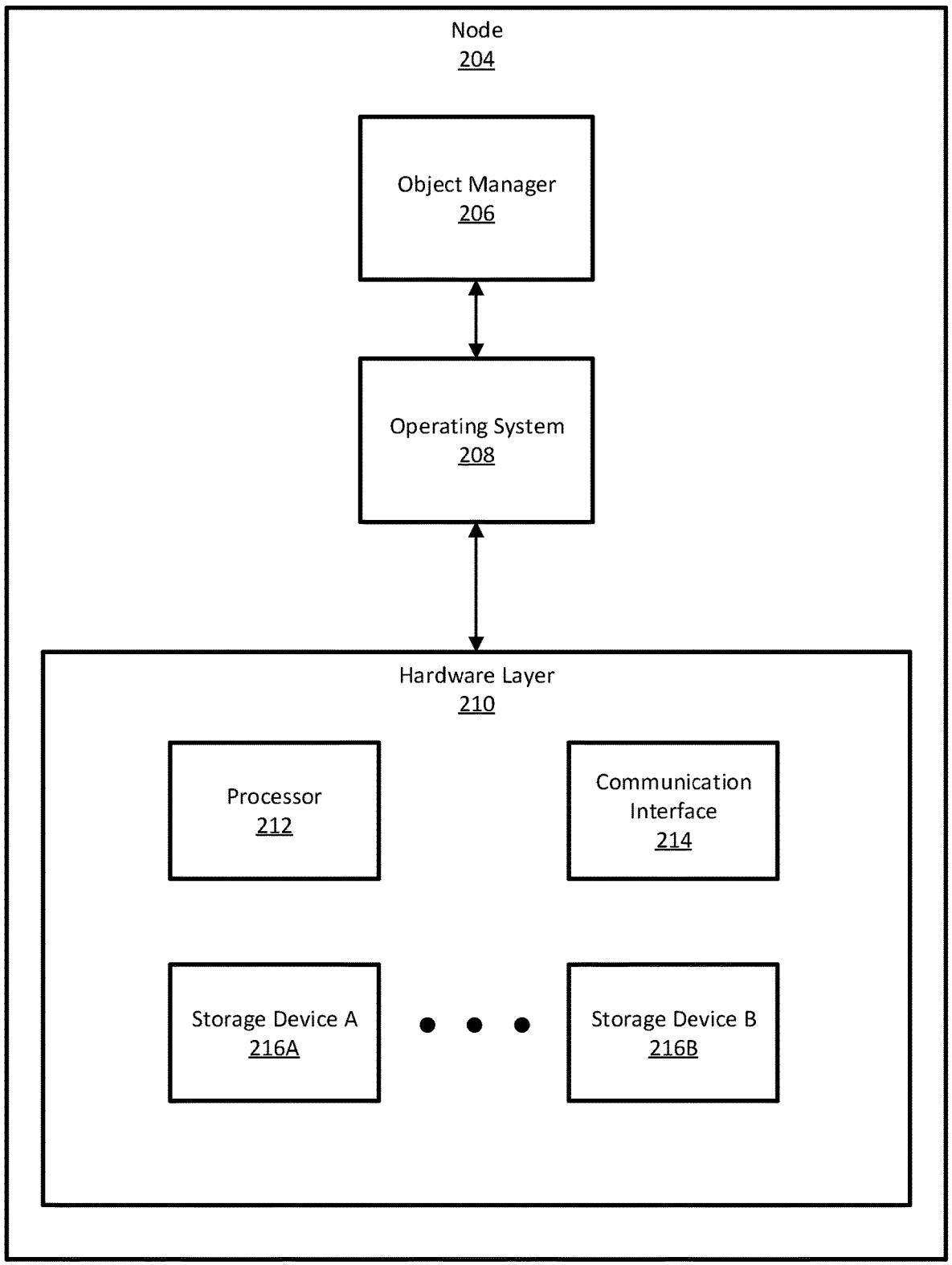
FIG. 2 shows a diagram of node, in accordance with one or more embodiments of the invention.

FIG. 2 shows a diagram of node, in accordance with one or more embodiments of the invention. A node (e.g., node (204)) may include an object manager (e.g., object manager (206)), an operating system (e.g., operating system (208)), and a hardware layer (e.g., hardware layer (210)). Each of these components is described below.

In one or more embodiments of the invention, an object manager (e.g., object manager (206)) is software executing within user space of the node (204), that may include instructions which, when executed by a processor (212), initiate the performance of one or more operations of components of the hardware layer (210). Although object manager (206) is shown executing directly interacting with operating system (208), object manager (206) may execute inside of an application container (not shown). That is, object manager (206) may execute in an isolated instance, within an application container that is executing directly within user space of the node (204). Specifically, an object manager (206) may collect and analyze data related to one or more objects, and based on that analysis, the object manager (206) may relocate (e.g., copy) one or more objects from one storage device to another storage device. An object manager (206) may perform the process described in the discussion of FIG. 7 below.

In one or more embodiments of the invention, an operating system (e.g., operating system (208)) is software executing on the node (204). In one embodiment of the invention, an operating system (208) coordinates operations between software executing in user space (e.g., object manager (206)) and one or more components of the hardware layer (210) to facilitate the proper use of the components of the hardware layer (210). In one embodiment of the invention, the operating system (208) may be executing software that monitors data traversing the operating system (208) (e.g., interactions between user space software and hardware layer (210) components) and may intercept, modify, and/or otherwise alter that data based on one or more conditions specified by the software executing in user space (e.g., object manager (206)).

In one or more embodiments of the invention, a hardware layer (e.g., hardware layer (210)) is a collection of physical components configured to perform the operations of the node (204) and/or otherwise execute the software of the node (204) (object manager (206), operating system (208)). The hardware layer (210) may include a processor (e.g., processor (212)), a communication interface (e.g., communication interface (214)), and one or more storage devices (e.g., storage device A (216A), storage device B (216B), etc.). Each of these components is described below.

In one or more embodiments, a processor (e.g., processor (212)) is an integrated circuit for processing instructions (e.g., those of node (204), software (e.g., 206, 208), and/or those received via a communication interface (e.g., communication interface (214)). In one embodiment, a processor (212) may be one or more processor cores or processor micro-cores.

In one or more embodiments of the invention, a communication interface (e.g., communication interface (214)) is a hardware component that provides capabilities to interface a computing device with one or more devices (e.g., through a network to another client, another server, a network of devices, etc.) and allow for the transmission and receipt of data with those devices. A communication interface may communicate via any suitable form of wired interface (e.g., Ethernet, fiber optic, serial communication etc.) and/or wireless interface and utilize one or more protocols for the transmission and receipt of data (e.g., Transmission Control Protocol (TCP)/Internet Protocol (IP), Remote Direct Memory Access (RDMA), Institute of Electrical and Electronics Engineers (IEEE) 801.11, etc.).

In one or more embodiments, storage device (e.g., storage device A (216A), storage device B (216B)) is one or more hardware devices capable of storing digital information (e.g., data) in a non-transitory medium. Non-limiting examples of storage devices (216A, 216B) include integrated circuit storage devices (e.g., solid-state drive (SSD), Non-Volatile Memory Express (NVMe), flash memory, etc.), magnetic storage (e.g., hard disk drive (HDD), floppy disk, tape, diskette, etc.), or optical media (e.g., compact disc (CD), digital versatile disc (DVD), etc.).

While FIG. 2 shows a specific configuration of a node, other configurations may be used without departing from the scope of the invention. Accordingly, embodiments disclosed herein should not be limited to the configuration of devices and/or components shown in FIG. 2.

Figure 3:
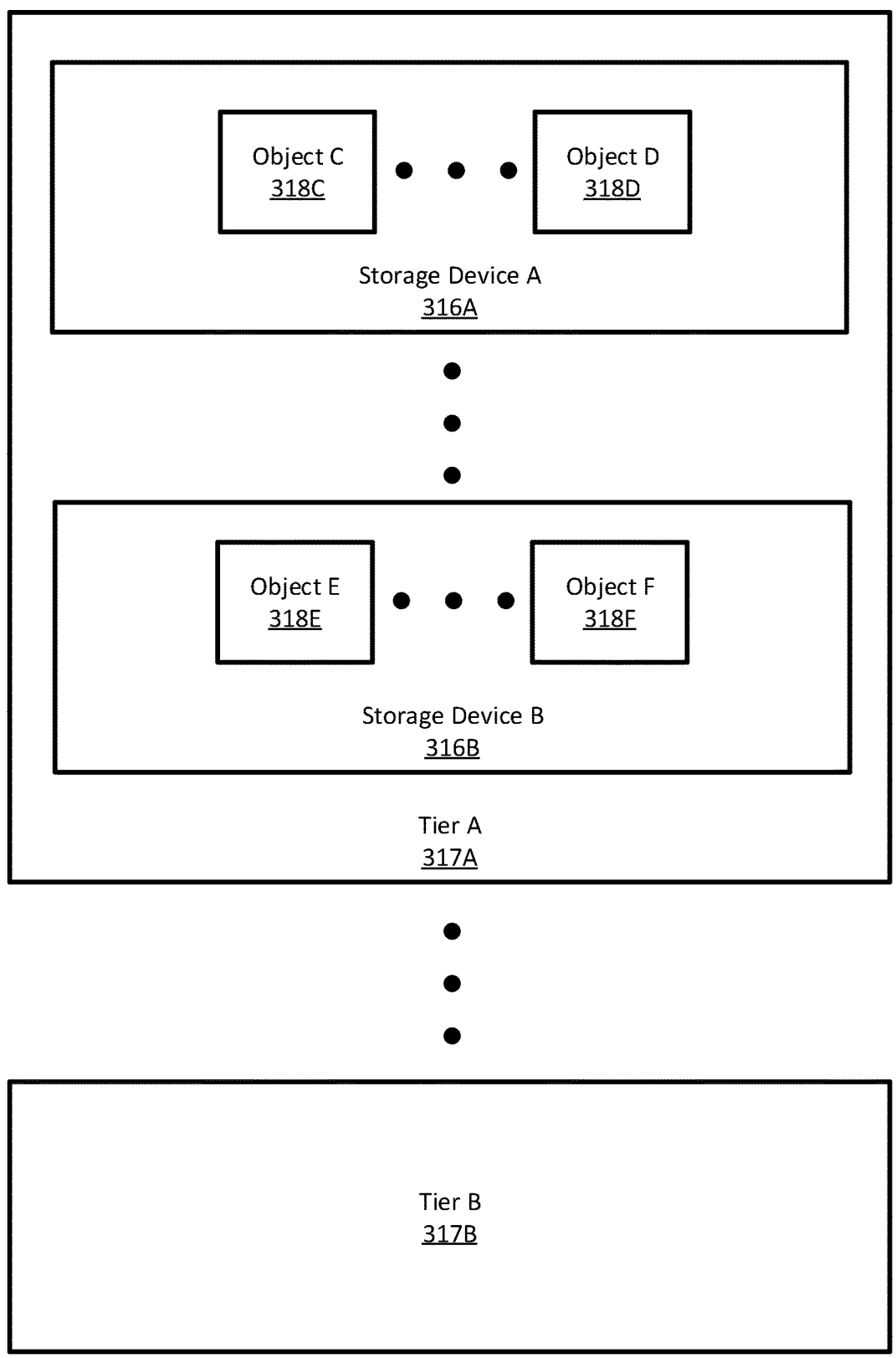
FIG. 3 shows a diagram of tiers, in accordance with one or more embodiments of the invention.

FIG. 3 shows a diagram of tiers, in accordance with one or more embodiments of the invention. A tier (e.g., tier A (317A), tier B (317B), etc.) is an abstract categorization of storage devices (e.g., storage device A (316A), storage device B (316B), etc.) based on one or more criteria. For example, one or more storage device(s) (e.g., 316A, 316B) may be placed into a tier (e.g., 317A, 317B) based on their comparatively similar speed of reading/writing data. Alternatively, one or more storage device(s) (e.g., 316A, 316B) may be placed into a tier (e.g., 317A, 317B) based on their type of storage (e.g., a tier for integrated circuit storage devices, a tier for magnetic storage devices, etc.). For example, Dynamic Random Access memory (DRAM) and persistent memory devices may be the fastest storage devices in the node, thus placing DRAM and persistent memory in a first (highest) tier. Next, flash memory may be in a second tier due to flash memory being slower than DRAM and persistent memory. Then, a third tier may include Non-Volatile Memory express (NVMe) devices and other SSD devices with similar speed specifications that are slower at performing read/write operations than DRAM, persistent memory, and flash memory. A fourth tier may include HDD devices and other disk based storage devices. Lastly, a fifth (lowest) tier may include storage devices used for archiving data (e.g., magnetic tape). One of ordinary skill in the art having the benefit of this detailed description would appreciate that tiers (317A, 317B) may be based on any property of one or more storages devices (e.g., 316A, 316B).

Further, storage devices (e.g., 316A, 316B) may include one or more object(s) (e.g., object C (318C), object D (318D), object E (318E), object F (318F), etc.). In one or more embodiments of the invention, an object (e.g., object C (318C), object D (318D), object E (318E), object F (318F)) is a file (e.g., a collection of data) that is organized into a known format that may be read and/or altered by one or more processes executing on a node. Objects (e.g., 318C, 318D, 318E, 318F) may be relocatable as entire units; that is, an object may be copied, in its entirety, from one storage device to a different storage device (or different location on the same storage device). For example, when handling the locations to write objects, one or more processes of the node (e.g., the object manager) may consider an object the smallest continuous collection of data that may be moved (e.g., an object may not be divided into smaller components). Further, object(s) (318C, 318D, 318E, 318F) may include segments that contain data specific to one property of the object. That is, an object relating to a person may include an "age" segment, a "height" segment, a "hair color" segment, etc. Accordingly, a collection of objects related to individual persons may be processed, analyzed, moved, using one or more of the segments that are included in the object.

While FIG. 3 shows a specific configuration of tiers, other configurations may be used without departing from the scope of the invention. For example, although objects are shown in storage devices, any type of data (e.g., individual bytes, data files, etc.) may be stored on the storage devices. Accordingly, embodiments disclosed herein should not be limited to the configuration of devices and/or components shown in FIG. 3.

Figure 4:
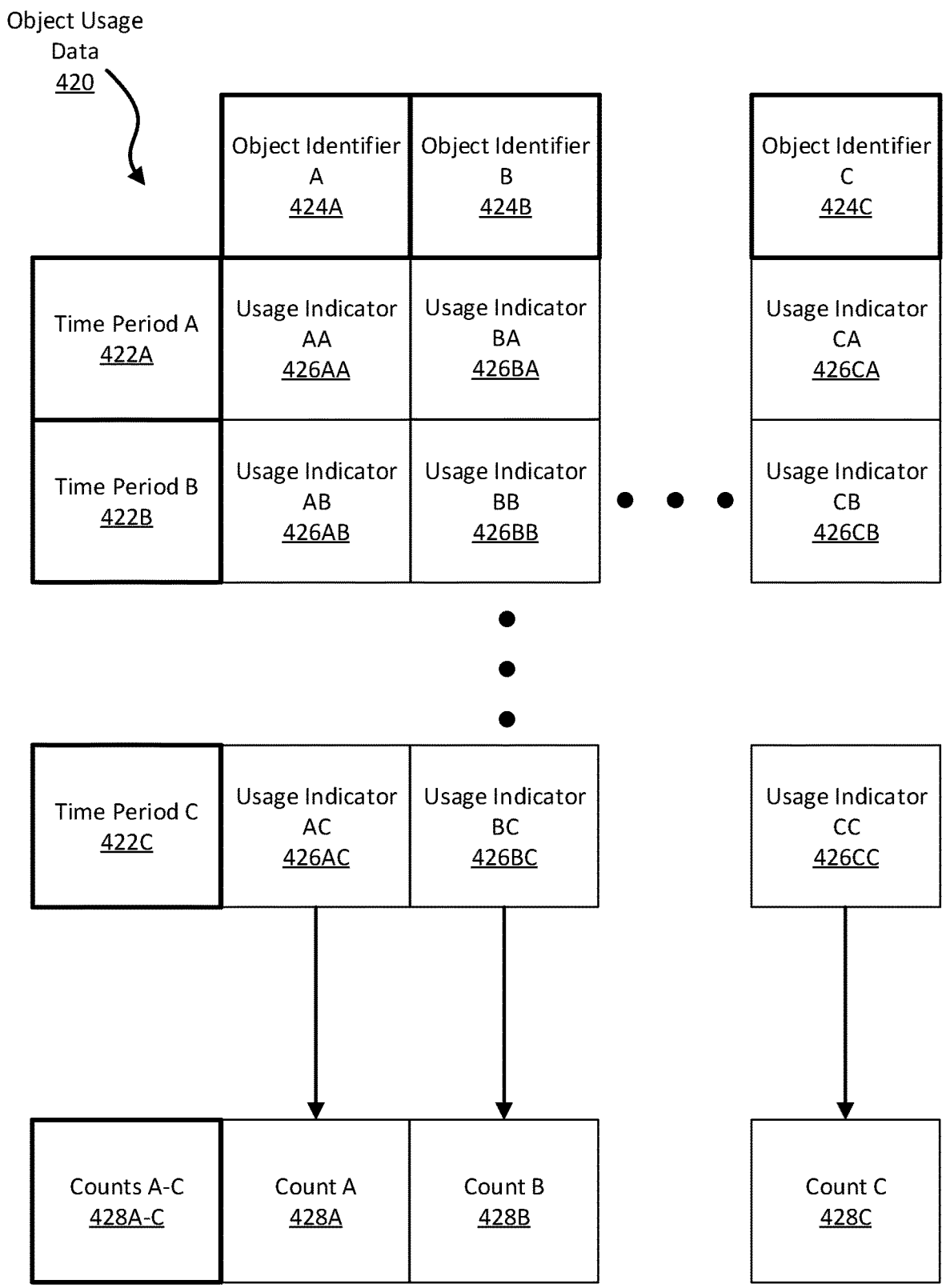
FIG. 4 shows a diagram of object usage data, in accordance with one or more embodiments of the invention.

FIG. 4 shows a diagram of object usage data, in accordance with one or more embodiments of the invention. In one or more embodiments of the invention, object usage data (e.g., object usage data (420)) is data that includes information about the usage of (reading of and/or writing to) objects on storage devices within one or more time period(s). The usage of an object may be stored as a usage indicator (e.g., usage indicators (426)) that specify the use (i.e., reading/writing) of a specific object identified by a corresponding object identifier (e.g., object identifier A (424A), object identifier B (424B), object identifier C (424C)). Further, usage indicators may also be associated with a time period (e.g., time period A (422A), time period B (422B), time period C (422C)) in which the object was used.

In one or more embodiments of the invention, an object identifier (e.g., object identifier A (424A), object identifier B (424B), object identifier C (424C)) is an alphanumeric expression uniquely associated with an object. The alphanumeric expression may be encoded using a standard protocol for alphanumeric characters (e.g., Unicode, American Standard Code for Information Interchange (ANSII), etc.). In one embodiment of the invention, the object identifier (424A, 424B, 424C) is automatically generated by one or more node(s) when the object is initially created. One of ordinary skill in the art, having the benefit of this detailed description, would appreciate that an object identifier (424A, 424B, 424C) may be any alphanumeric expression that is unique to the associated object.

In one or more embodiments of the invention, a time period (e.g., time period A (422A), time period B (422B), time period C (422C)) is an alphanumeric expression uniquely associated with a finite period of time. In one or more embodiments of the invention, each time period (422A, 422B, 422C) is unique and corresponds to a period of time that does not overlap with any other time period (422A, 422B, 422C) in the object usage data (420). Further, in one or more embodiments, a time period (422A, 422B, 422C) may represent a period of time that is continuously before or after an adjacent time period (422A, 422B, 422C) (e.g., time period A (422A) may represent 0-59 seconds and time period B (422B) may represent 60-119 seconds).

In one or more embodiments of the invention, object usage data (420) may be in the form of one or more bitmaps. As an example, object usage data (420) may exist as a 'write' bitmap where the usage indicator (426AA-CC) may be in binary format (i.e., "0" or "1") to indicate whether the object was written to ("1") or not written to ("0") in the corresponding time period. Similarly, the object usage data (420) may exist as a 'read' bitmap where the binary usage indicators (426) represent that the object was read ("1") or not read ("0") during the time period (422) associated with the usage indicator (426). Lastly, object usage data (420) may be a single table, where usage indicators (426) may be represented by (1) empty values (" ") indicating no read and no write, (2) an "R" value indicating that a 'read' occurred, or (3) a "W" value indicating that a 'write' occurred. One of ordinary skill in the art having the benefit of this detailed description would appreciate that object usage data (420) may be presented and stored in many different ways, but still include the same information.

In one or more embodiments of the invention, a count (e.g., counts 428A-C) may be calculated by summing the total number of reads, writes, and/or reads and writes on an object during the all time periods (422) in the object usage data (420). That is, in one or more embodiments of the invention, a count is the number of occurrences of an object being used (i.e., accessed by read or manipulated by write) during every time period (e.g., 422A-422C) within the object usage data (420). In one or more embodiments of the invention, a count may be used by an object manager to determine if an object is a candidate for further analysis and optimization.

While FIG. 4 shows a specific configuration of object usage data, other configurations may be used without departing from the scope of the invention. Accordingly, embodiments disclosed herein should not be limited to the configuration of devices and/or components shown in FIG. 4.

Figure 5:
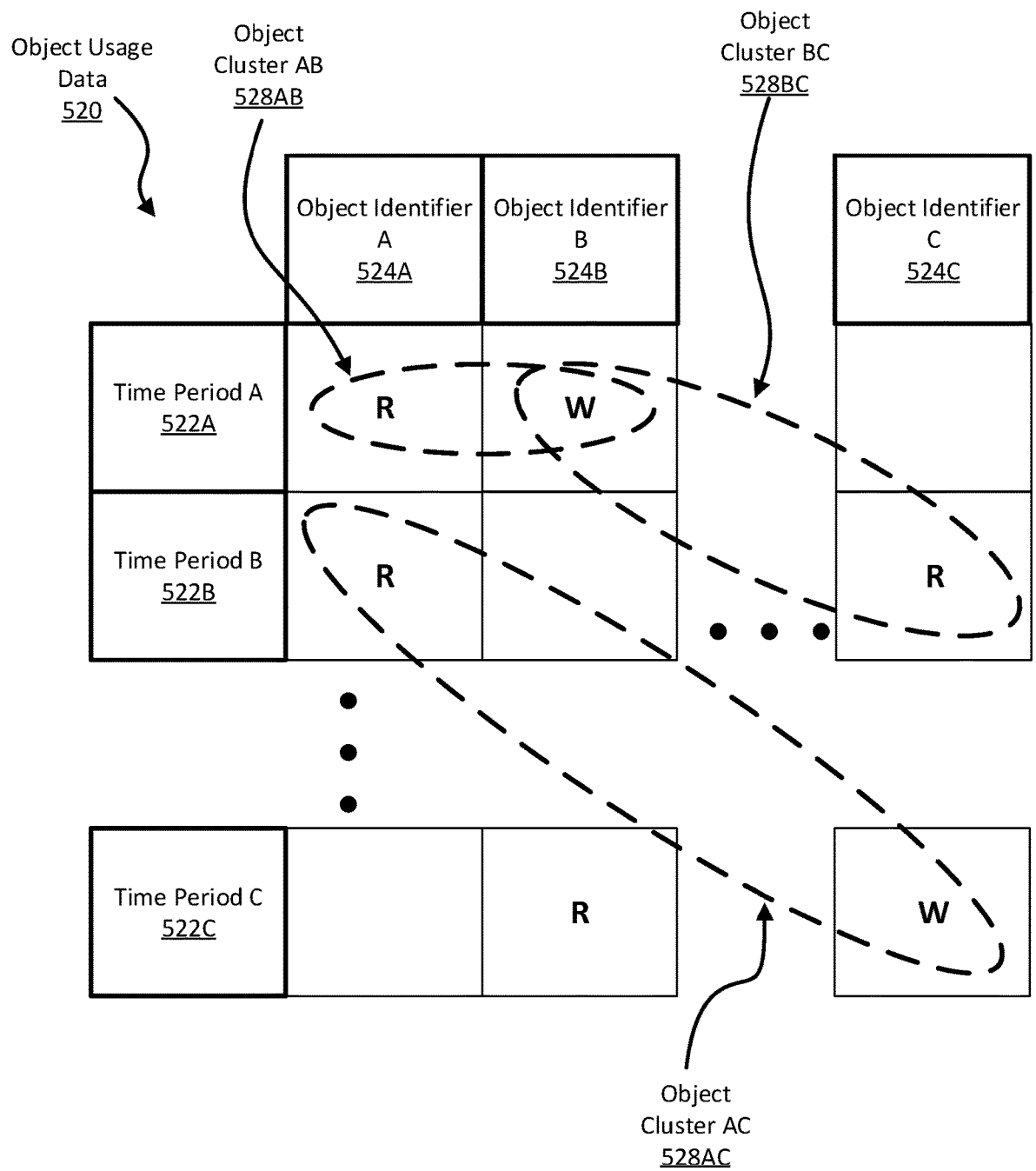
FIG. 5 shows a diagram of object clusters, in accordance with one or more embodiments of the invention.

FIG. 5 shows a diagram of object clusters, in accordance with one or more embodiments of the invention. As explained in the description of FIG. 4, the object usage data (520) contains usage indicators that may be represented as "R", "W", or empty (" ") (as shown in FIG. 5) to indicate whether that object was read from, written to, or unused, respectively, during the corresponding time period. Further, patterns of object usage may be identified to form one or more object clusters (e.g., object cluster AB (528AB), object cluster BC (528BC), object cluster AC (528AC)). Object clusters (528AB, 528BC, 528AC) include two or more objects that are associated based on some pattern of usage among those two or more objects.

For example, as shown in FIG. 5, object A (as represented by object identifier A (524A)) was read at time period A (522A) while object B (as represented by object identifier B (524B)) was written to in that same time period (time period A (522A)). Accordingly, object A and object B are grouped into object cluster AB (528AB) that is labeled as including "parallel" objects. That is, because objects A and B are concurrently used within the same time period (e.g., time period A (522A)), the objects of the object cluster, and the object cluster generally, is considered "parallel".

As another example, as shown in FIG. 5, object B (as represented by object identifier B (524B)) was written to at time period A (522A) while object C (as represented by object identifier C (524C)) was read in the next time period (time period B (522B)). Accordingly, object B and object C are grouped into object cluster BC (528BC) that is labeled as including "sequential" objects. That is, because objects B and C are used in consecutive time periods (time period A (522A) then time period B (522B)), the object cluster is considered "sequential".

Similarly, object A (as represented by object identifier A (524A)) was read at time period B (522B) while object C (as represented by object identifier C (524C)) was written to in the next time period (time period C (522C)). Accordingly, object A and object C are grouped into object cluster AC (528AC) that is labeled as including "sequential" objects. That is, because objects A and C are used in consecutive time periods (time period B (522B) then time period C (522C)), the object cluster is considered "sequential".

While FIG. 5 shows a specific configuration of object cluster, other configurations may be used without departing from the scope of the invention. For example, one of ordinary skill in the art having the benefit of this detailed description would appreciate that object clusters (528AB, 528BC, 528AC) may be based on larger number of usage indicators. Accordingly, embodiments disclosed herein should not be limited to the configuration of devices and/or components shown in FIG. 5.

Figure 6:
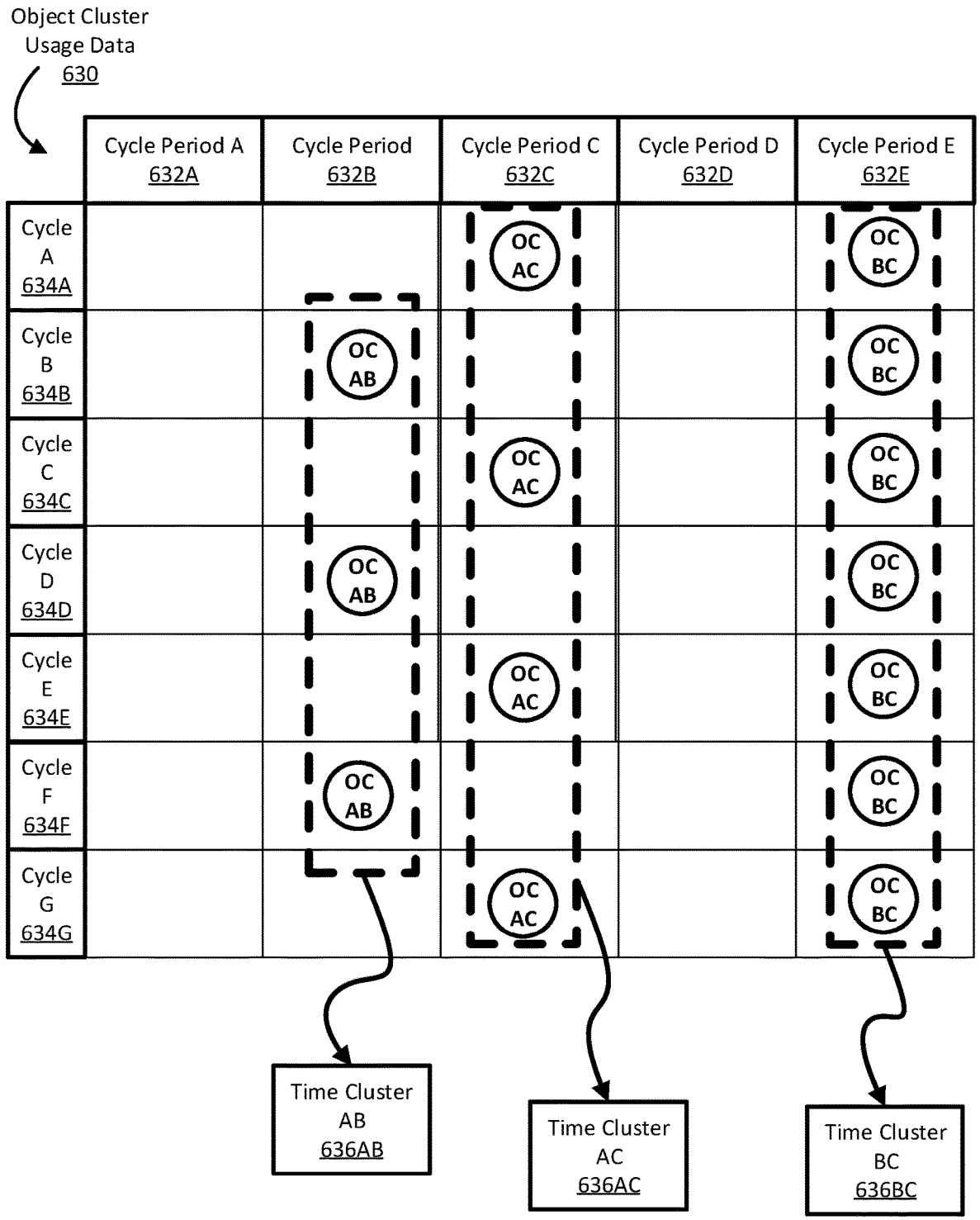
FIG. 6 shows a diagram of object cluster usage data, in accordance with one or more embodiments of the invention.

FIG. 6 shows a diagram of object cluster usage data, in accordance with one or more embodiments of the invention. In one or more embodiments of the invention, object cluster usage data (e.g., object cluster usage data (630)) is data that includes information about the usage of objects clusters (e.g., "OC AB", "OC AC", "OC BC") through the system. The usage of an object cluster may be identified by monitoring for usage of the object cluster and storing the cycle period(s) (e.g., cycle period A-E (632A-E)) and the cycle(s) (e.g., cycle A-G (634A-G)) at which the object cluster was utilized (i.e., when the objects of the object cluster were utilized).

In one or more embodiments of the invention, a cycle (e.g., cycle A-G (634A-G)) is a time period sufficiently large enough to capture a repeating pattern of object cluster uses, if measured for significantly long enough. Further, cycle periods (e.g., cycle period A-E (632A-E)) are consecutive and exclusive sub-portion time periods of a cycle (634A-G).

For example, if a cycle is a day, a cycle period might be an hour. If a cycle is a week, a cycle period could be a day. In one or more embodiments of the invention, after identifying a set of object cluster, the object manager monitors larger cycles to collect data on when the object clusters are used.

In one or more embodiments of the invention, a time cluster (e.g., time cluster AB (636AB), time cluster AC (636AC), time cluster BC (636BC)) is the grouping of two or more object cluster uses across two or more cycles. As can be seen in the embodiment shown in FIG. 6, a repeating pattern of object clusters does not necessarily occur within the duration of a single cycle. For example, object cluster AB ("OC AB") and object cluster AC ("OC AC") repeat every other cycle. Thus, time cluster AB (636AB) includes the known instances where object cluster AB repeats, even though each repetition is larger than a single cycle. Alternatively, as shown with object cluster BC ("OC BC"), the object cluster is utilized every cycle (cycles A-G (634A-G)), in the same cycle period (cycle period E (632E)).

While FIG. 6 shows a specific configuration of object cluster usage data, other configurations may be used without departing from the scope of the invention. Accordingly, embodiments disclosed herein should not be limited to the configuration of devices and/or components shown in FIG. 6.

Figure 7:
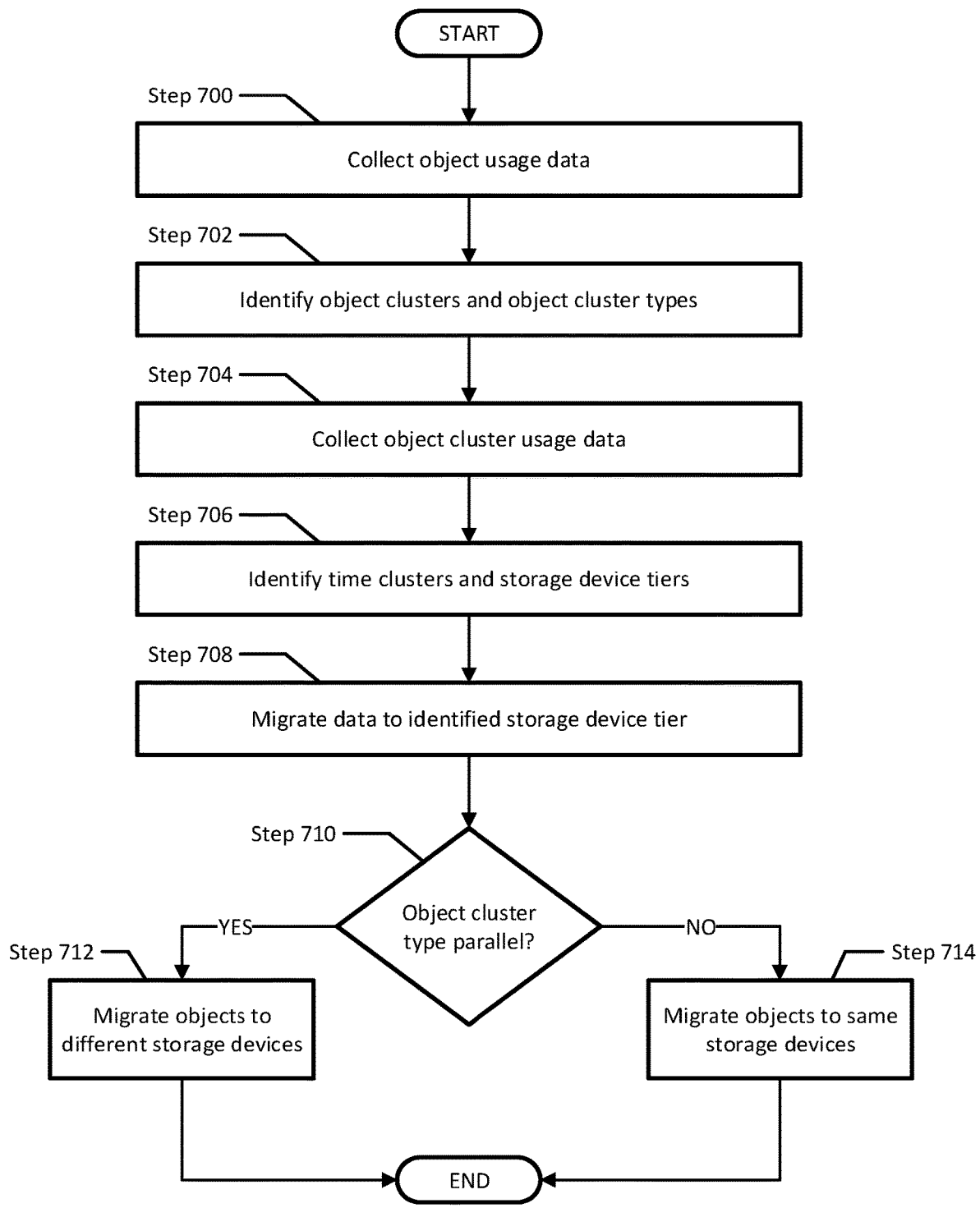
FIG. 7 shows a flowchart of a method of migrating objects, in accordance with one or more embodiments of the invention.

FIG. 7 shows a flowchart of a method of migrating objects, in accordance with one or more embodiments of the invention.

In Step 700, an object manager collects object usage data. In one or more embodiments of the invention, the object manager will begin to collect object usage data for two or more objects in two or more storage devices. The object manager may initiate collection of object usage data based on user input, or the object manager may begin collecting object usage data based on an automated and/or scheduled command. The object manager collects object usage data for two or more objects for a finite amount of time that may be divided into some number of time periods. Once obtained, the object manager may analyze the object usage data to determine which objects were used, what their usage type was (read or write), and when the usage occurred.

Further, based on the usage, the object manager calculates a count for each object over the measured time. In one or more embodiments of the invention, the object manager may use a minimum threshold count for an object to be considered for optimization. In one or more embodiments of the invention, if the object did not have sufficient reads/writes to obtain a count that exceeds the minimum threshold, the object manager will not process any more information related to that object (until additional object usage data is collected).

In Step 702, the object manager identifies object clusters based on usage patterns. In one or more embodiments of the invention, the object manager may utilize one or more artificial intelligence (e.g., machine learning) to identify object clusters. As an example, the object manager may analyze bitmap forms of the object usage data using a convolutional neural network (CNN) to identify patterns of usage between and among different objects. In one or more embodiments of the invention, the object clusters may be identified as different types of object clusters. As explained in the description of FIG. 5, objects in an objects cluster may be accessed in parallel or sequential orders. As the exact time periods in which object usage occurs is known, the object manager can see the difference in time between object uses within a single object cluster. Accordingly, object clusters are given a property regarding the ordering of object access of the objects therein.

In Step 704, the object manager collects object cluster usage data. In one or more embodiments of the invention, the object manager monitors the system for a longer periods time ("cycles") to identify any repeating patterns of the object clusters. In one or more embodiments of the invention, the cycles occur over comparatively larger lengths of time than the time periods used to collect the initial object usage data in Step 700.

In Step 706, after the object manager collects the object cluster usage data, the object manager identifies repeating patterns of the usage of the object clusters across two or more cycles, and the cycle periods in which they occur. Further, the object manager identifies the tier best associated with the object cluster. In one or more embodiments of the invention, object clusters may be used in cyclic patterns in a given cycle. For example, an object cluster may be utilized (read and/or read from) every other Friday (for payroll purposes), or at the end of every month (for tax purposes).

For determining storage device tiers, for example, if the objects of the object cluster are used frequently, the object manager may identify that the object should exist in a high storage tier (to enable faster read/write operations). Alternatively, if the objects are used infrequently and are likely to be unused for a certain duration of time (based on the known cycle pattern), the object manager may identify that those lesser used objects should be located in a lower tier with slower storage devices (such that faster storage devices of higher tiers are freed for other higher-demand data).

In Step 708, the object manager migrates one or more objects of the object cluster to one or more tiers identified in Step 706. That is, if the object clusters that were identified to belong to a high tier are persisting in a lower tier, the object manager copies those object clusters from the lower tier to the higher tier (i.e., on the storage devices that are designated as belonging to that higher tier). Conversely, if object clusters were identified as belonging to a lower tier are persisting a in a higher tier, those object clusters are copied to the storage devices of the lower tier.

In Step 710, the object manager makes a determination if the object cluster type is 'sequential' or 'parallel'. If the object cluster type is parallel, the process proceeds to Step 712. Alternatively, if the object manager determines that the object type is sequential, the process proceeds to Step 714.

In Step 712, if the object manager determines the object cluster type is parallel, the object manager copies the objects of the object cluster to different storage devices within the tier. That is, objects, in an object cluster, with a 'parallel' property are copied to different storage devices in the tier. Objects that are accessed in parallel are placed on different storage devices so that the access to those objects may be achieved with less latency than if the two object had to share the output capabilities of a single storage device.

In Step 714, if the object manager determines the object cluster type is sequential, the object manager copies the objects of the object cluster to the same storage devices within the tier. That is, objects, in an object cluster, with a 'sequential' property are copied to the same storage devices in the tier. Objects that are accessed in sequential order are placed on the same storage devices because there is not loss in efficiency by keeping the object on the same device. The process that is using the objects of the object cluster does not request the individual objects concurrently. Accordingly, it can be assured that the storage device will not be occupied servicing the requests for the first object while also servicing requests for the second object. Accordingly, higher latency may be maintained without dividing the objects across multiple storage devices. The process may end following Step 714.

Figure 8:
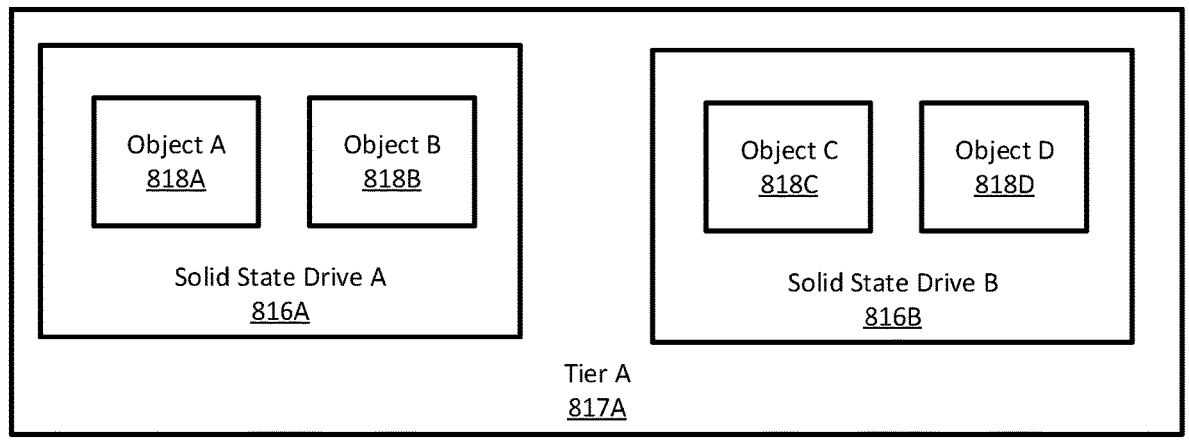
FIG. 8 shows an example of tiers, in accordance with one or more embodiments of the invention.
Figure 8:
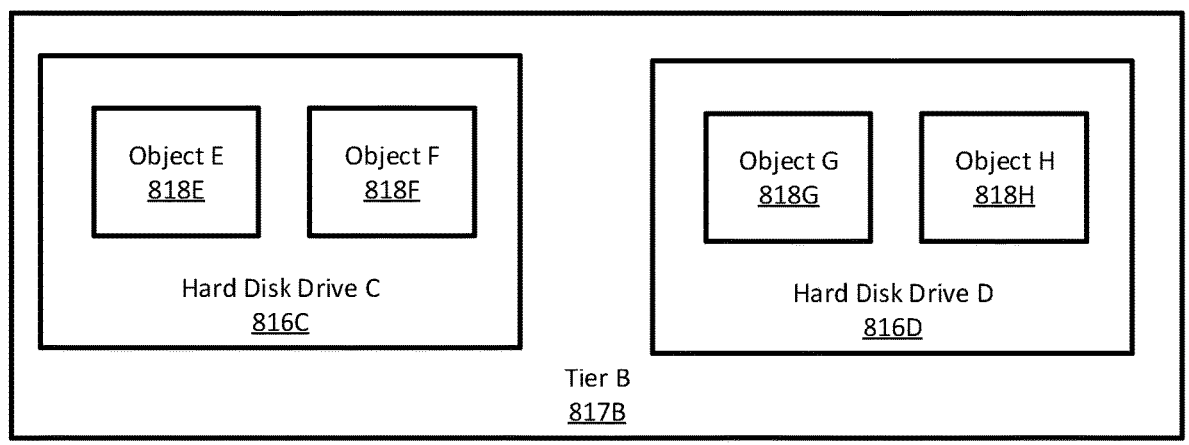

FIG. 8 shows an example of tiers, in accordance with one or more embodiments of the invention. As discussed in the description of FIG. 3, a tier is an abstract categorization of storage devices based on one or more criteria. Specifically, for the examples used throughout FIGS. 8-13B, there exists two tiers (tier A (817A), tier B (817B)), where tier A (817A) includes solid state drive A (816A) and solid state drive B (816B) and tier B (817B) includes hard disk drive C (816C) and hard disk drive D (816D). Further, solid state drive A (816A) includes object A (818A) and object B (818B), solid state drive B (816B) includes object C (818C) and object D (818D), hard disk drive C (816C) includes object E (818E) and object F (818F), and hard disk drive D (816D) includes object G (818G) and object H (818H).

Figure 9:
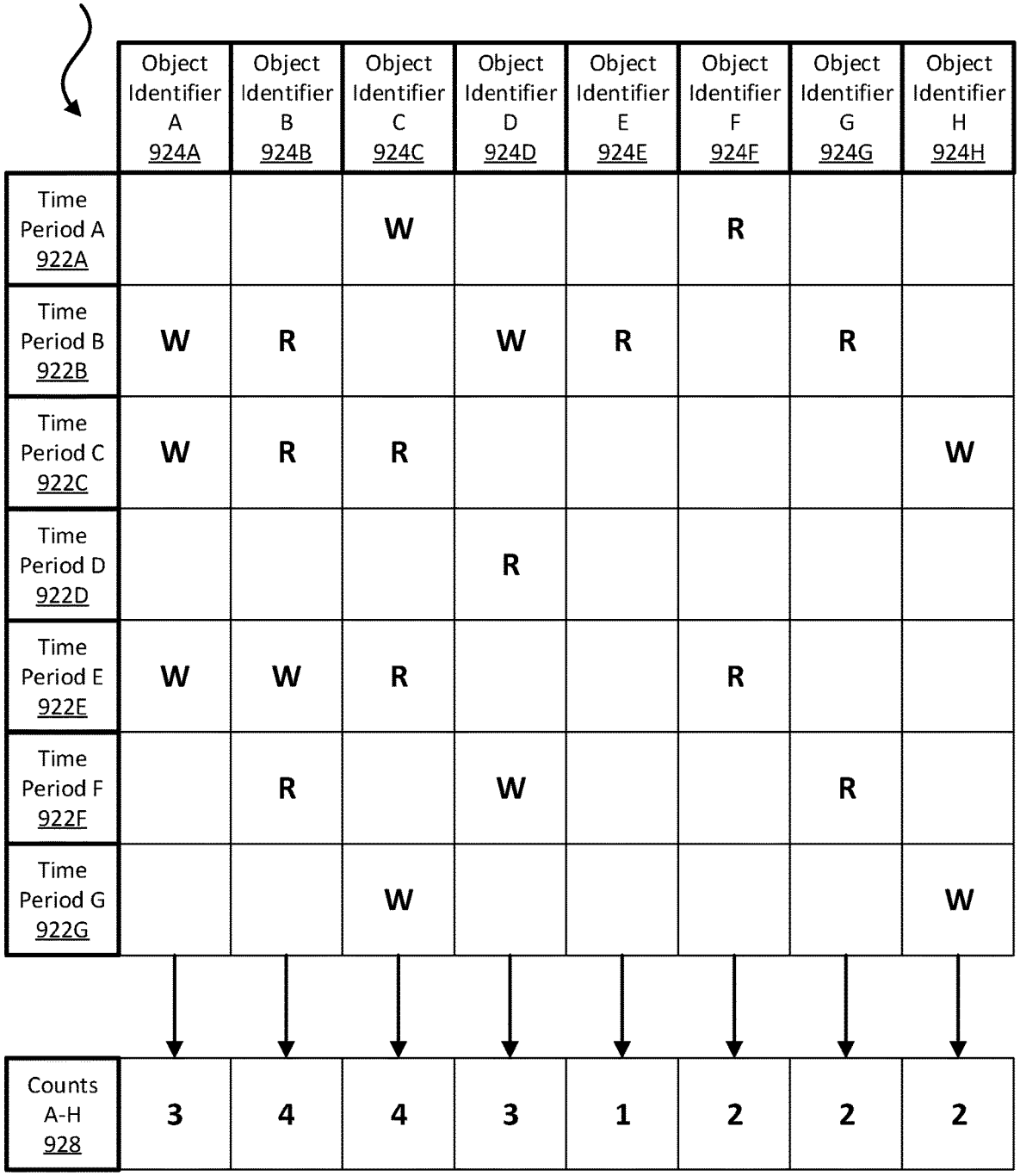
FIG. 9 shows an example of object usage data, in accordance with one or more embodiments of the invention.

FIG. 9 shows an example of object usage data, in accordance with one or more embodiments of the invention. As discussed in the description of FIG. 4, object usage data (e.g., object usage data (920)) is data that includes information about the usage of (reading of and/or writing to) objects on storage devices within one or more time period(s). Association shown in the example of FIG. 9, object usage data (920) includes a single table that indicates whether objects A-H (as identified by object identifiers A-H (924A-H)) were used during time periods A-G (922A-G). Specifically, object usage data (920) includes usage indicators that are either blank, include an "R", or include a "W", to indicate the type of usage (no usage, read, and write, respectively).

Further, count A-H (928) is calculated to sum the total uses of each object during time periods A-G (922-A-G). As an example, object B (as represented by object identifier B (924B)) has four total uses during time periods A-G (922A-G) (reads at time periods B, C, and F and a write at time period E). Similarly, the total uses of each object is summed to create a count for that object. In the examples of FIG. 8-13B, the minimum threshold count for consideration to be optimized is 2. Accordingly, object E (with a count E (928) of "1") will not be considered for optimization by the object manager.

Figure 10:
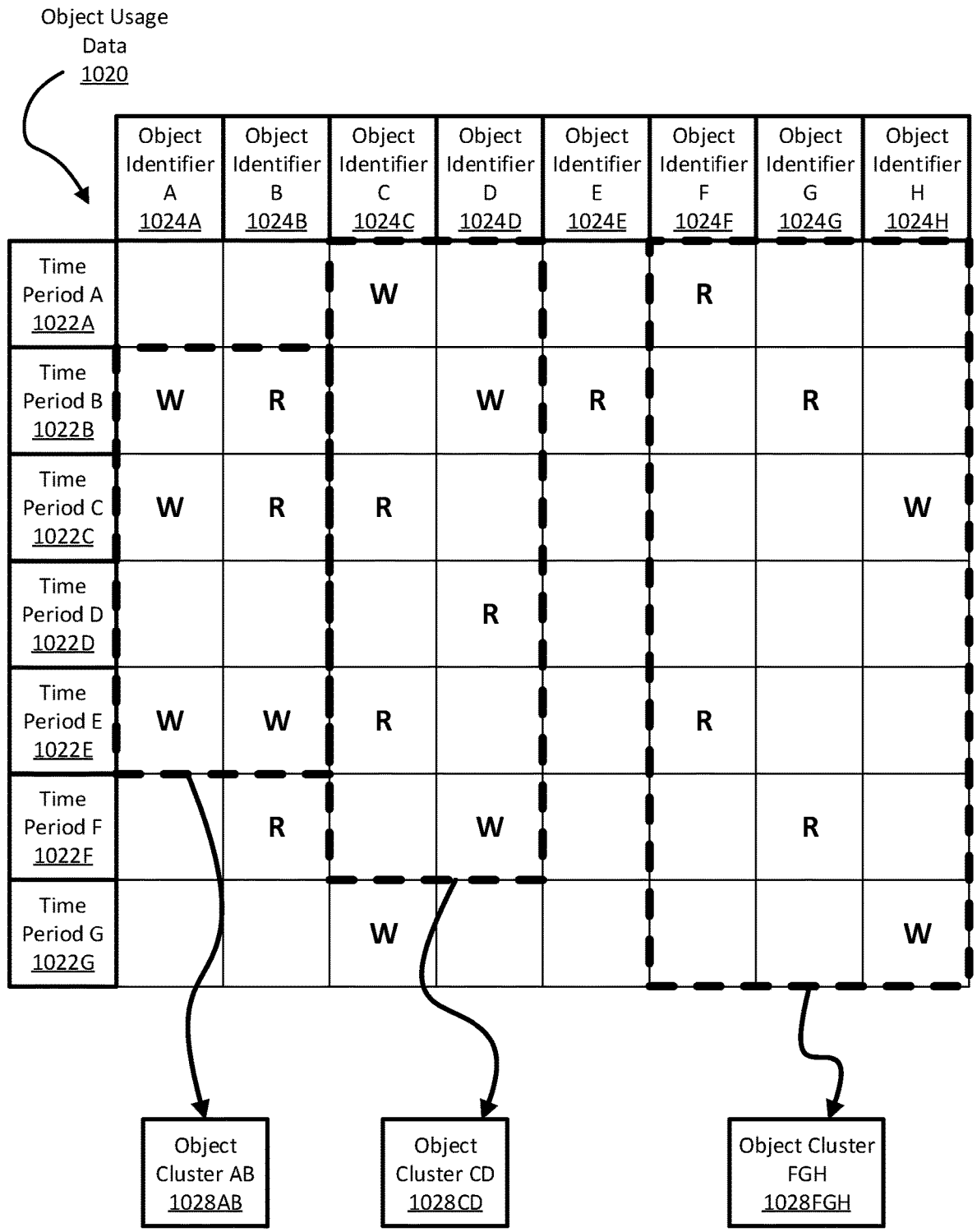
FIG. 10 shows an example of object clusters, in accordance with one or more embodiments of the invention.

FIG. 10 shows an example of object clusters (e.g., 1028AB, 1028CD, 1028FGH) in object cluster usage data (1020), in accordance with one or more embodiments of the invention. As discussed in the description of FIG. 5 and Step 702 of FIG. 7, the object manager identifies object clusters (e.g., object cluster AB (1028AB), object cluster CD (1028CD), and object cluster FGH (1028FGH)) based on usage patterns. As shown in the example of FIG. 10, object cluster AB (1028AB) is a parallel-type object cluster as object A and object B are accessed during the same three time periods (time period B (1022B), time period C (1022C), time period E (1022E)). Alternatively, object cluster CD (1028CD) is a sequential-type object cluster as object C and object D are accessed at different time periods (time period A-F (1022A-F)). Lasty, object cluster FGH (1028FGH) is a sequential-type object cluster as object F, object G, and object H are accessed at different time periods (time period A-G (1022A-G)).

Figure 11:
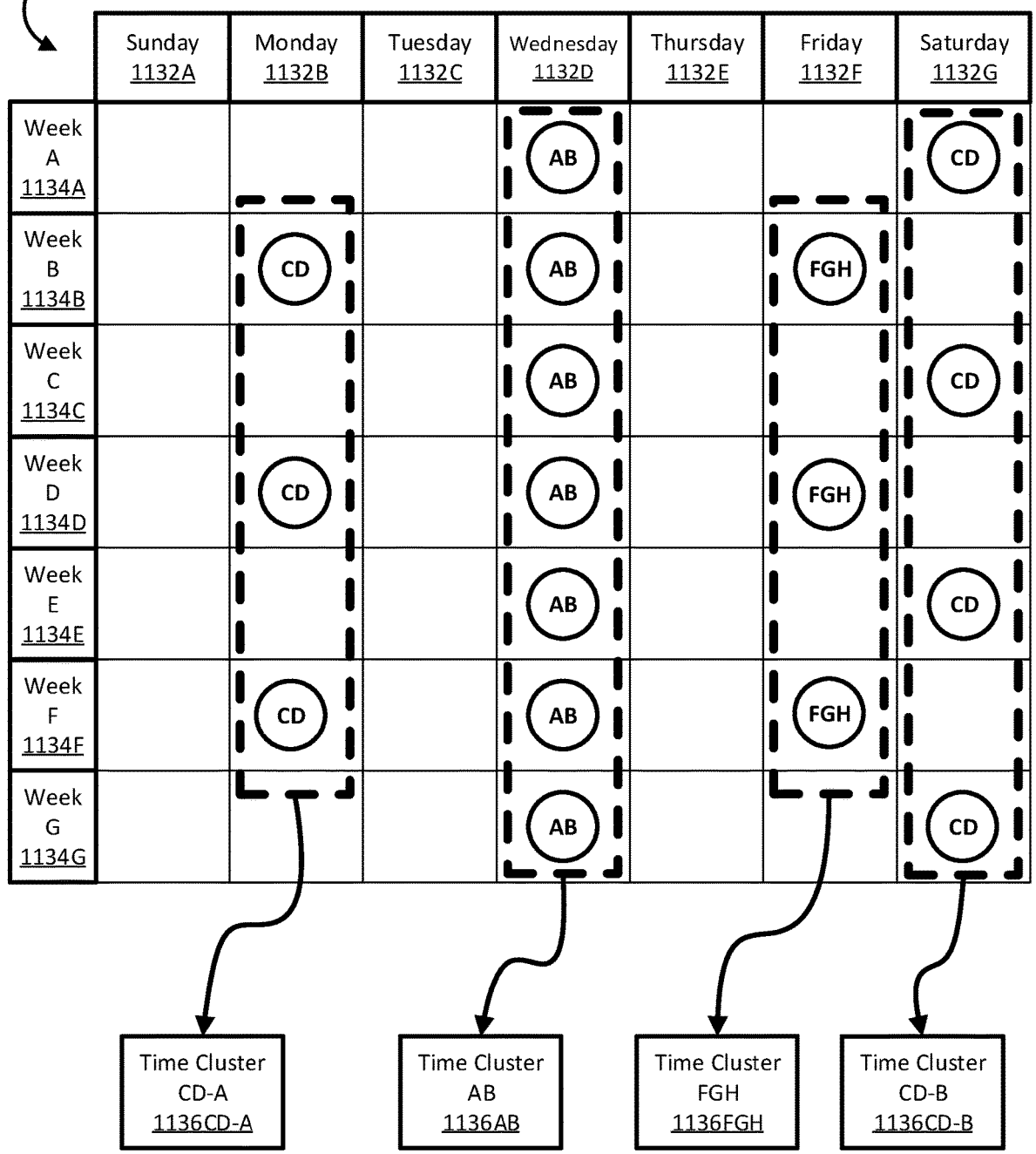
FIG. 11 shows an example of object cluster usage data, in accordance with one or more embodiments of the invention.

FIG. 11 shows an example of object cluster usage data (1130), in accordance with one or more embodiments of the invention. As discussed in the description of FIG. 6, the usage of an object cluster may be identified by monitoring for usage of the object cluster and storing the cycle period(s) (days of the week (1132A-G) as shown in FIG. 11) and the cycle(s) (e.g., weeks A-G (1134A-G) as shown in FIG. 11) at which the object cluster was utilized (i.e., when the objects of the object cluster were utilized).

As shown in FIG. 11, object cluster CD is shown in two time clusters (time cluster CD-A (1136CD-A) and time cluster CD-B (1136CD-B)) occurring on Monday (1132B) and Saturday (1132G) respectively, rotating each week. Also, occurring every week, object cluster AB is accessed every Wednesday (1132D) to form time cluster AB (1136AB). Lastly, object cluster FGH is used only three times in the seven weeks monitored every other Friday (1132F) to form time cluster FGH (1136FGH).

FIG. 12 shows an example of actions taken by an object manager, in accordance with one or more embodiments of the invention. As shown in the example of FIG. 12, object cluster AB, with objects A and B, should exist in tier B (a faster tier) as the object manager analyzed the relative access frequency of object cluster AB and determined that the frequency (seven occurrences in seven cycles) is tied for the highest access frequency compared to the other object clusters. Further, as the objects (A and B) are accessed in parallel, the object should be moved to different storage devices in tier B.

Object cluster CD, with objects C and D, should exist in tier A as the object manager analyzed objects C and D and determined that the type of data does not require low latency capabilities. Therefore, the processes using objects C and D would not suffer from moving the data to tier A. That is, although the frequency of usage (seven occurrences in seven cycles, broken between Monday and Saturday) is tied for the highest access frequency with object cluster AB, the lack of need for faster storage devices allows the objects to be placed on a lower tier and leave the higher tier storage devices free for other data. Further, as the object are accessed in sequential order, the object should be moved to the same storage devices in tier A.

Lastly, object cluster FGH, with objects F, G, and H, should exist in tier B as the object manager analyzed the process using object cluster FGH and determined that the process is given high priority and must be completed in a short amount of time. Accordingly, although object cluster FGH is used with less frequency (three occurrences in seven cycles), the high priority of the process demands that the data be placed on the higher tier (tier B). Further, as the object are accessed in sequential order, the object should be moved to the same storage devices in tier B.

Figure 13A:
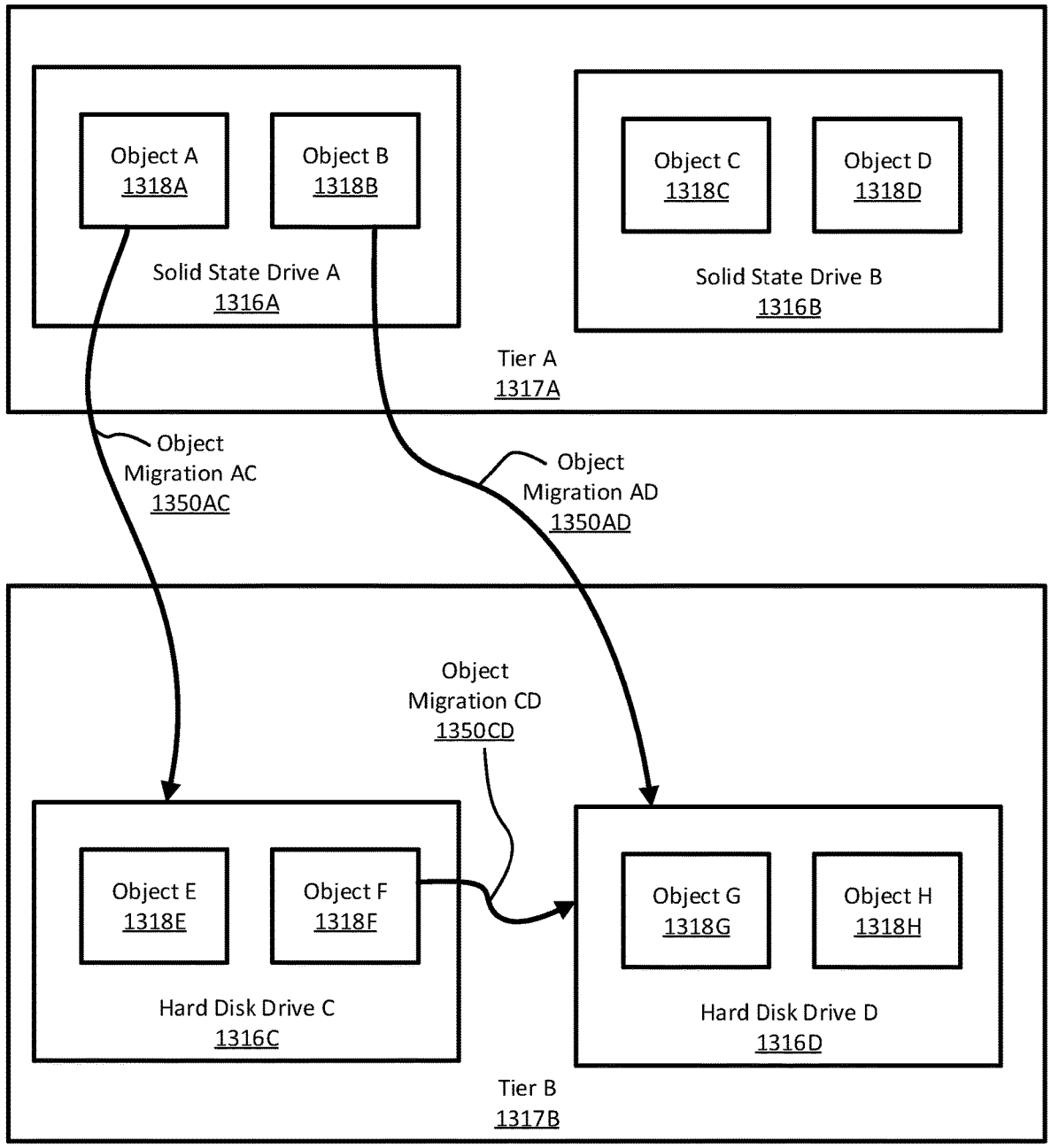
FIG. 13A shows an example of object cluster usage data prior to optimization, in accordance with one or more embodiments of the invention.

FIG. 13A shows an example of object cluster usage data prior to optimization, in accordance with one or more embodiments of the invention. The layout of the object in FIG. 13 is the same as shown in FIG. 8. However, three object migrations are shown (object migration AC (1350AC), object migration AD (1350AD), and object migration CD (1350CD)) indicating which objects are being moved, where those object are located prior to optimization (i.e., their location in FIG. 13A), and the location to where they will be moved (tier and storage device) after optimization.

Figure 13B:
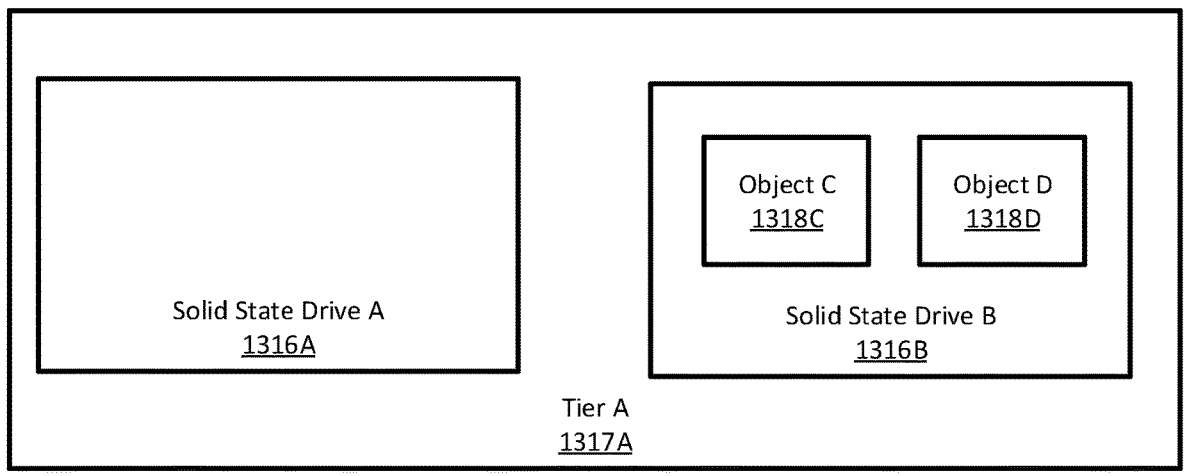
FIG. 13B shows an example of object cluster usage data after optimization, in accordance with one or more embodiments of the invention.
Figure 13B:
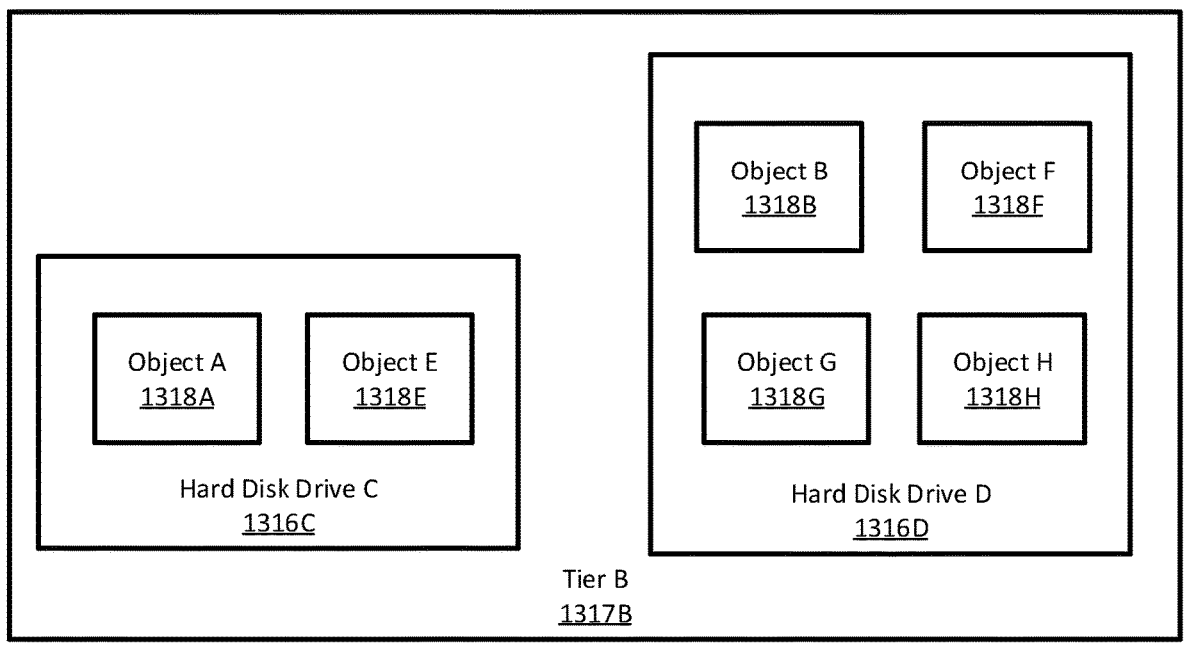

FIG. 13B shows an example of object cluster usage data after optimization, in accordance with one or more embodiments of the invention. Similar to the example shown in FIG. 13A, FIG. 13B shows the tiers, storage devices, and objects thereof after the object manager has optimized the objects. That is, object A (1318A) is moved from solid state drive A (1316A) of tier A (1317A) to hard disk drive C (1316C) of tier B (1317B). Object F (1318F) of hard disk drive C (1316C) of tier B (1317B) is moved to hard disk drive D (1316D) of tier B (1317B). And, lastly, object B (1318B) is moved from solid state drive A (1316A) of tier A (1317A) to hard disk drive D (1316D) of tier B (1317B), thus completing the optimization steps performed by the object manager.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for storing data in a system comprising a plurality of storage devices, the method comprising:
    obtaining object usage data from the plurality of storage devices, wherein the object usage data comprises:
        a plurality of object identifiers;
        a plurality of time periods;
        a plurality of usage indicators each uniquely associated with an object identifier of the plurality of object identifiers and a time period of the plurality of time periods;
    determining, using the object usage data, object clusters, wherein at least one object cluster of the object clusters comprises at least two objects that are associated based on access patterns; and
    migrate a first object, of the at least two objects, from a first storage device of the plurality of storage devices to a second storage device of the plurality of storage devices; and
    wherein the object usage data further comprises:
        a first usage indicator of the plurality of object indicators that identifies access to the first object at a first time period of the plurality of time periods; and
        a second usage indicator of the plurality of object indicators that identifies access to a second object, of the two objects, at a second time period of the plurality of time periods,
            wherein the second object is stored on the second storage device,
            wherein migrating the first object is based on the first usage indicator and the second usage indicator.

2. The method of claim 1, wherein after migrating the first object, the method further comprises:
    migrating a second object, of the two objects, to the second storage device, wherein the second storage device belongs to a different tier than the first storage device.

3. The method of claim 1, wherein at least one of the plurality of storage devices is a magnetic storage device.

4. The method of claim 1, wherein the first storage device of the plurality of storage devices is located on a first node in the system and the second storage device of the plurality of storage devices is located on a second node in the system.

5. A non-transitory computer readable medium comprising instructions which, when executed by a computer processor, enables the computer processor to perform a method for storing data in a system comprising a plurality of storage devices, the method comprising:
    obtaining object usage data from the plurality of storage devices, wherein the object usage data comprises:
        a plurality of object identifiers;
        a plurality of time periods; and
        a plurality of usage indicators each uniquely associated with an object identifier of the plurality of object identifiers and a time period of the plurality of time periods;
    determining, using the object usage data, object clusters, wherein at least one object cluster of the object clusters comprises at least two objects that are associated based on access patterns; and
    migrate a first object, of the at least two objects, from a first storage device of the plurality of storage devices to a second storage device of the plurality of storage devices; and
    wherein the object usage data further comprises:
        a first usage indicator of the plurality of object indicators that identifies access to the first object at a first time period of the plurality of time periods; and
        a second usage indicator of the plurality of object indicators that identifies access to a second object, of the two objects, at a second time period of the plurality of time periods,
            wherein the second object is stored on the second storage device,
            wherein migrating the first object is based on the first usage indicator and the second usage indicator.

6. The non-transitory computer readable medium of claim 5, wherein after migrating the first object, the method further comprises:
    migrating a second object, of the two objects, to the second storage device, wherein the second storage device belongs to a different tier than the first storage device.

7. The non-transitory computer readable medium of claim 5, wherein at least one of the plurality of storage devices is a magnetic storage device.

8. The non-transitory computer readable medium of claim 5, wherein the first storage device of the plurality of storage devices is located on a first node in the system and the second storage device of the plurality of storage devices is located on a second node in the system.

9. A node, comprising:
    a plurality of storage devices; memory; and
    a processor, wherein the processor is configured to perform a method for storing data in the node, the method comprising:
        obtaining object usage data from the plurality of storage devices, wherein the object usage data comprises:
            a plurality of object identifiers;
            a plurality of time periods; and
            a plurality of usage indicators each uniquely associated with an object identifier of the plurality of object identifiers and a time period of the plurality of time periods;
        determining, using the object usage data, object clusters, wherein at least one object cluster of the object clusters comprises at least two objects that are associated based on access patterns; and
        migrate a first object, of the at least two objects, from a first storage device of the plurality of storage devices to a second storage device of the plurality of storage devices; and
        wherein the object usage data further comprises:
            a first usage indicator of the plurality of object indicators that identifies access to the first object at a first time period of the plurality of time periods; and
            a second usage indicator of the plurality of object indicators that identifies access to a second object, of the two objects, at a second time period of the plurality of time periods,
                wherein the second object is stored on the second storage device, wherein migrating the first object is based on the first usage indicator and the second usage indicator.

10. The node of claim 9, wherein after migrating the first object, the method further comprises:
   migrating a second object, of the two objects, to the second storage device, wherein the second storage device belongs to a different tier than the first storage device.

11. The node of claim 9, wherein at least one of the plurality of storage devices is a magnetic storage device.

\* \* \* \* \*